United States Patent
Raguin

(10) Patent No.: US 12,488,617 B2
(45) Date of Patent: Dec. 2, 2025

(54) POROUS PLATEN FOR BIOMETRIC SCANNING

(71) Applicant: HID Global Corp., Austin, TX (US)

(72) Inventor: Daniel Henri Raguin, Jupiter, FL (US)

(73) Assignee: HID Global Corp., Austin, TX (US)

( * ) Notice: Subject to any disclaimer, the term of this patent is extended or adjusted under 35 U.S.C. 154(b) by 0 days.

(21) Appl. No.: 18/390,799

(22) Filed: Dec. 20, 2023

(65) Prior Publication Data
US 2025/0209848 A1    Jun. 26, 2025

(51) Int. Cl.
G06V 40/12    (2022.01)
G06V 40/13    (2022.01)

(52) U.S. Cl.
CPC ...... *G06V 40/1353* (2022.01); *G06V 40/1324* (2022.01)

(58) Field of Classification Search
CPC .................. G06V 40/1353; G06V 40/1324
See application file for complete search history.

(56) References Cited

U.S. PATENT DOCUMENTS

| | | | |
|---|---|---|---|
| 2,195,699 A | 4/1940 | Johnson | |
| 5,416,573 A | 5/1995 | Sartor, Jr. | |
| 5,879,454 A * | 3/1999 | Peng | A61B 5/1172 |
| | | | 118/244 |
| 2010/0113952 A1 * | 5/2010 | Raguin | G06V 40/1394 |
| | | | 324/692 |
| 2018/0040675 A1 * | 2/2018 | Zeng | H10K 50/805 |

OTHER PUBLICATIONS

"Antimicrobial Wikipedia", [Online]. Retrieved from the Internet: https: en.wikipedia. org wiki Antimicrobial, (Accessed online Dec. 20, 2023), 14 pages.

"Antibacterial soap Wikipedia", [Online]. Retrieved from the Internet: https: en.wikipedia.org wiki Antibacterial_soap, (Accessed online Dec. 20, 2023), 3 pages.

Adams and Chittenden Scientific, "Frit Porosity and Sizes", [Online]. Retrieved from the Internet: https: adamschittenden.com technical frits frit-size, (Accessed online Dec. 20, 2023), 4 pages.

Coorstek Corporation, "Porous Silica Material", [Online]. Retrieved from the Internet: https: www.coorstek.co.jp eng rd detail_02.html, (Accessed online Dec. 20, 2023), 6 pages.

(Continued)

*Primary Examiner* — Abhishek Sarma
(74) *Attorney, Agent, or Firm* — Schwegman Lundberg & Woessner, P.A.

(57) ABSTRACT

Various approaches are described herein for enhancing biometric scanning in a biometric scanning system. For example, a porous region of a platen can be wetted with a liquid, the porous region sized and shaped for contact with skin of a subject (such as a finger or palm), and the porous region defining respective pore structures to house the liquid for wetting the skin when the skin is in contact with the porous region. Topological features of skin in contact with the porous region can be imaged, such as ridges of a fingerprint. The topological features generally contrast with a background field illuminated by a light source, with contrast enhanced in response to a presence of the liquid versus no liquid being present.

18 Claims, 5 Drawing Sheets

(56) References Cited

OTHER PUBLICATIONS

Puskarova, Andrea, "The antibacterial and antifungal activity of six essential oils and their cyto genotoxicity to human HEL 12469 cells", Scientific RePorTS 7 8211, (Aug. 15, 2017), 11 pages.

Winska, Katarzyna, "Essential Oils as Antimicrobial Agents Myth or Real Alternative", Molecules 2019 24 2130, (Jun. 5, 2019), 21 pages.

* cited by examiner

POROUS PLATEN FOR BIOMETRIC SCANNING

FIELD OF THE DISCLOSURE

This document pertains generally, but not by way of limitation, to biometric scanning, and more particularly to enhancement of imaging of skin, such as of an extremity, in contact with a platen.

BACKGROUND

Fingerprint scanning is one approach that can be used to uniquely identify individuals biometrically. Such identification can be used in association with law enforcement activity, background verification such as associated with international border crossing (e.g., the "US-VISIT" biometric program), and for commercial applications. Commercial applications include access control (physical or virtual), time-and-attendance tracking, or point-of-sale (e.g., an employee using their fingerprint to gain access to a cash register), as illustrative examples.

SUMMARY OF THE DISCLOSURE

Various approaches can be used to image features defined by skin of a subject for performing biometric identification or related verification. For example, topological features of an extremity (such as a portion or an entirety of a fingerprint defining ridge patterns) can be imaged to provide identification or verification based on biometric indicia that are unique to an individual. Generally, when the skin of the subject being imaged has a normal moisture level, or are damp or even wet, imaging can be performed without complication. The present inventor has recognized, among other things, that when the skin of the imaging subject is dry, the skin does not wet naturally to a surface (e.g., a glass platen or other surface). This lack of wetting behavior can be problematic for certain scanning technologies, such as scanners that operate using Fresnel reflection (e.g., TFT or other "lensless" optical scanner configurations) or frustrated total internal reflection (FTIR) in order to perform imaging.

In one approach, where a scanner operates using FTIR, a silicone coating or a removable silicone membrane can be used that is placed on a glass or plastic platen of the scanner. Use of silicone allows the ridges of dry fingerprints to wet naturally to a surface, allowing light to reach the fingerprint ridges. By contrast, without such wetting, very thin areas of air still present between the dry ridges of the skin of the subject and the platen can cause internal reflection within the platen, resulting in loss of contrast or even complete inhibition of imaging. Use of such silicone coatings or removable silicone membranes can present various drawbacks. For example, such coatings or membranes may be scratched, soiled, or easily worn. The present inventor has recognized, among other things, that other approaches can be used to provide such wetting without requiring use of a vulnerable permanent silicon coating or removable silicon membrane.

As an illustration, the present subject matter can include incorporation of a porous region in a platen of a biometric scanner. For example, the porous region can include a porous solid material defined by a set of pore structures to house a liquid for wetting the skin when the skin is in contact with the porous region. A reservoir can be fluidically coupled with the porous region. Liquid can be drawn from the exposed platen surface such as via application of mechanical force or passively (such as by capillary force). In this manner, an exposed surface where skin is to be scanned, is refreshed with a thin layer of liquid that allows a dry extremity, such as a fingertip, to wet to the platen. Such wetting can enhance contrast (e.g., contrast is enhanced in response to a presence of the liquid versus no liquid).

A porous region may be etched or otherwise fabricated from the same material as the platen, or it may be a material with the specified porosity that mated with the platen to enable fluidic transport for wetting, as mentioned above. Generally, a liquid housed or transported by the porous material is a non-volatile material such as an oil. Use of an oil can help to suppress evaporation. The liquid can be antimicrobial or can otherwise include an antimicrobial agent, such as to suppress growth or spread of pathogens between individuals using the scanner.

Generally, according to the present subject matter, use of a liquid in a porous region in the manner described herein will not adversely affect the imaging of topological features of the skin, and as discussed in this document, can enhance such imaging when the skin is otherwise dry. Various examples of liquid and porous structure combinations are described in this document. In an example, the liquid can closely match an optical index of refraction of the porous solid material such that light experiences little diffraction or scattering as a result of propagating through solid and liquid material regions. A periodicity of the porous medium (in the example of a periodic microfluidic structures), an average periodicity (in the case of random or quasi-random microfluidic structures) of the structure, or a size of respective pores can be specified to be below a corresponding imaging resolution of optical system. Another example can include establishing first main diffraction orders associated with the porous structure that occur at an angle larger than an acceptance angle of the imaging system.

Various approaches for liquid maintenance or replenishment can be used. For example, in a system where a reservoir is present, liquid can be refilled such as through a port or valve. In another example, replenishment can be achieved by pooling liquid on the platen, such as in combination with mechanical force on the puddle to entrain the liquid in the porous structure, or through passive activity such as capillary force.

In an example, the techniques described herein relate to a biometric scanning system (such as a fingerprint or palm scanner), including: a platen including a porous region sized and shaped for contact with skin of a subject, the porous region defining respective pore structures to house a liquid for wetting the skin when the skin is in contact with the porous region; a light source configured to illuminate the platen; and an imaging sensor configured to image the platen including imaging topological features defined by the skin in contact with the porous region, the topological features contrasting with a background field illuminated by the light source; wherein the contrast is enhanced when the liquid is present.

In an example, the techniques described herein relate to a method for enhancing biometric scanning in a biometric scanning system (such as a fingerprint or palm scanner), the method including: wetting a porous region of a platen with a liquid, the porous region sized and shaped for contact with skin of a subject, the porous region defining respective pore structures to house the liquid for wetting the skin when the skin is in contact with the porous region; incoupling light into the platen from a light source; and imaging topological features defined by the skin in contact with the porous region, the topological features contrasting with a background field illuminated by the light source, the contrasting enhanced in response to a presence of the liquid.

In an example, the techniques described herein relate to a biometric scanning system (such as a fingerprint or palm scanner), including: a platen including a porous region sized and shaped for contact with skin of a subject, the porous region defining respective pore structures to house a liquid for wetting the skin when the skin is in contact with the porous region; a reservoir for the liquid, the reservoir fluidically coupled with the porous region a light source configured to illuminate the platen; and an imaging sensor configured to image the platen including imaging topological features defined by the skin in contact with the porous region, the topological features contrasting with a background field illuminated by the light source; wherein the porous region includes a glass structure including at least one of: an etched material; a frit material; or an array or lattice configuration of respective pores.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Biometric scanning, such as fingerprint (or other unique skin print) sensing is widely used for identification or verification. Such scanning can be performed by a sensing apparatus whose output is processed, and a representation of a print (such as data or indicia characterizing such a print) can be compared with stored data to determine whether a match exists. Imaging of fingerprints (or other skin prints) can be performed capacitively, such as with use of thin-film transistor (TFT) technology but may also be performed optically with TFT sensors as well as with free-space imaging optics. In one approach, free-space imaging may be performed by acquiring an image of a direct view of a finger (or other extremity). In another approach, imaging based on Fresnel or total internal reflection (TIR) reflection differences can reveal contrast between topological features of a skin print, such as the ridges and valleys of a fingerprint, touching a platen.

Figure 1:
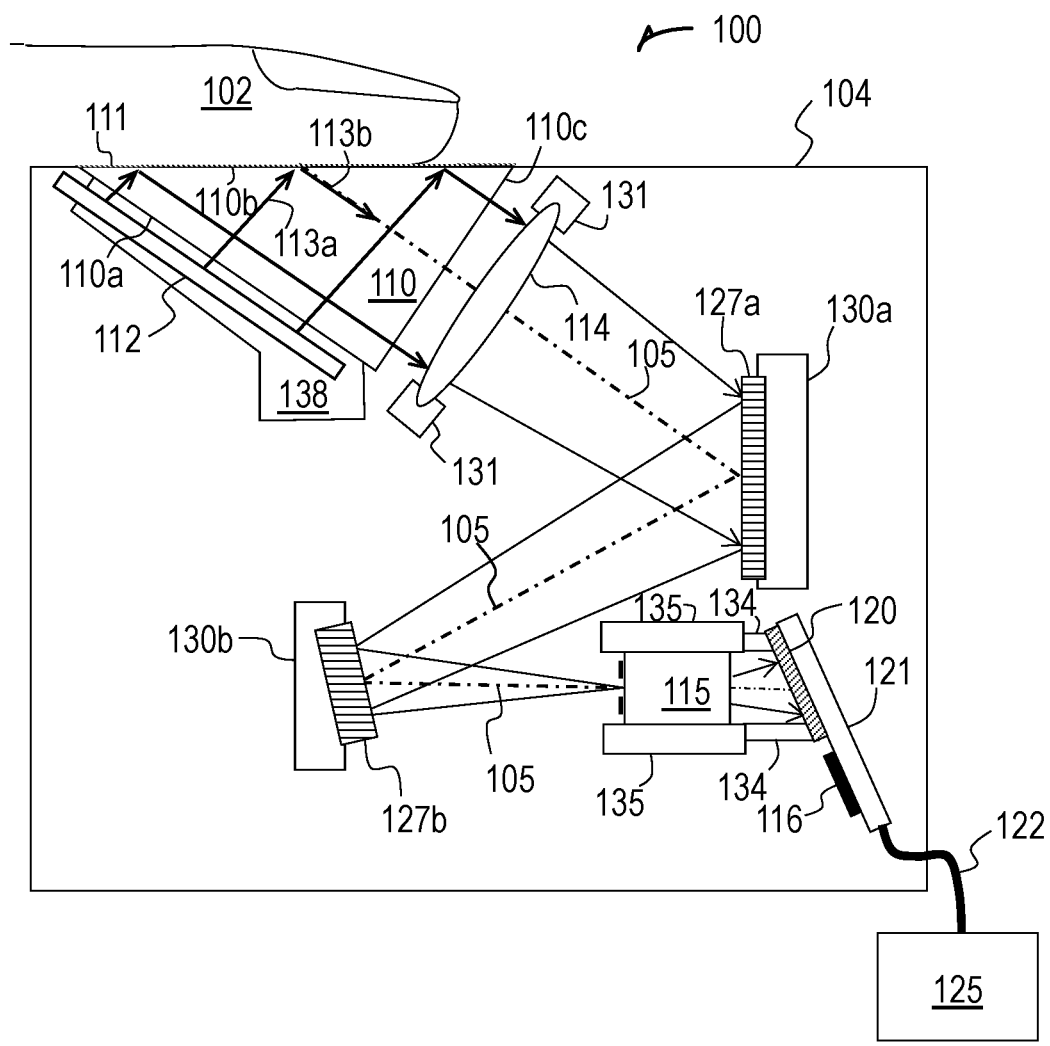
FIG. 1 illustrates generally an example comprising a biometric scanning system that uses Total Internal Reflection (TIR).

FIG. 1 illustrates generally an example comprising a biometric scanning system 100 that uses Total Internal Reflection (TIR). The biometric scanning system 100 generally uses an optical imaging technique based upon TIR. The components of the biometric scanning system 100 can be located on or within housing 104, such as in communication with a processing system 125 (e.g., a microcontroller, computer, mobile device, laptop, tablet, or other system such as a centralized processing system or server), or with on-board circuitry 116 for providing processing, user interface management, or control. Communication between the processing system 125 and other portions of the biometric scanning system 100 can be provided by a wired connection, such as via a cable 122 (e.g., providing one or more of power, networking signaling, or other communication), or using a wireless communication link. Generally, within the housing 104, light 113a from a light source 112 may be directed (e.g., incoupled) into a glass prism 110 via first prism face 110a onto a second prism face 110b, which provides a contact platen surface 111 upon which skin defining a surface topology is placed (such as a finger 102 as shown in FIG. 1 or other skin such as a portion or entirety of a palm). In this manner, the contact platen surface 111 is illuminated by the light source 112. Although contact platen surface 111 is drawn flat in the cross-sectional view of FIG. 1, it may be shaped in a non-planar manner to better capture the friction ridge detail of the skin under examination. By way of example, platen surface 111 may have a slight concave cylindrical shape to accept the friction ridge detail of a single finger or may have a convex spherical shape to accept the friction ridge detail of the palm of a hand, as illustrative but non-limiting examples.

When no finger 102 is placed on the contact platen surface 111, light 113b is generally reflected in a specular manner via TIR from the second prism face 110b and may pass through a third prism face 110c. The light can be redirected via an optional field lens 114, and the light is imaged by an objective lens 115 onto a two-dimensional (2D) imaging sensor 120. When the finger 102 is present, the light still experiences TIR where the fingerprint valleys are present, but where the fingerprint ridges touch the glass, light 113a experiences what can be referred to as "frustrated TIR" (FTIR). Generally, where FTIR exists, light is primarily absorbed by the fingerprint ridges, rather than being 100% reflected internally within the prism 110. This effect enhances contrast between ridges and valleys of the fingerprint as imaged by the imaging sensor 120, and versus a background field corresponding to the TIR where no finger 102 is present. Light 113a exiting the contact platen surface 111 (either radiated away or absorbed by the finger 102) can be referred to as light that is "out-coupled" from the prism 110.

The present inventor has recognized, among other things, that an enhanced-contrast fingerprint image is produced when respective ridges "wet" to the contact platen surface 111 such that there is no (or at least minimal) air trapped between the ridges and the contact platen surface 111. Otherwise, the FTIR effect will be suppressed (e.g., most light will remain internally reflected within the glass prism 110), resulting in a low-contrast image of the fingerprint. For compactness, various optical configurations can be used. For example, an optical path 105 can be "folded" using of one or more mirrors (e.g., mirror 127a and mirror 127b as shown in the illustrative but non-limiting example of FIG. 1). Mechanically the light source 112 and prism 110 can be held in place with a mechanical support 138, the field lens 114 with mechanical support 131, the mirrors 127a and 127b with mechanical support 130a and mechanical support 130b, and so on. As a further illustration, the objective lens 114 can be held in place with mechanical support 135 and the imaging sensor 120 can be held at a specified angle relative to the optical axis with a mechanical support 134. The imaging sensor 120 can be aligned or otherwise oriented such that the surface normal of the imaging sensor 120 is not parallel to the optical axis (e.g., corresponding to optical path 105). This non-zero angle is a result of imaging a tilted object plane (corresponding to the contact platen surface 111) and, in an example, corresponds to what is referred to as the "Scheimpflug" angle. Use of such an approach allows the majority or an entirety of the contact platen surface 111 to be kept in focus for imaging, from the perspective of the imaging sensor 120.

Figure 2:
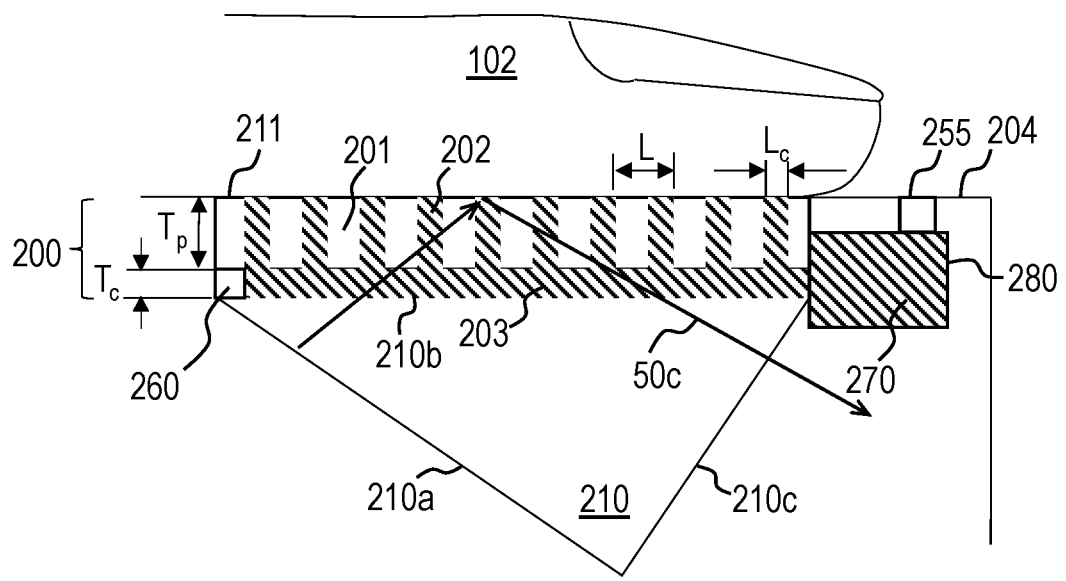
FIG. 2 illustrates generally an example comprising a portion of a biometric scanning system comprising a porous region associated with a platen.

The configuration shown in FIG. 1 is merely illustrative, and the present teachings are not limited to biometric scanning applications that utilize FTIR-based approaches and may be applied to non-TIR or Fresnel imaging systems, or optical or capacitive TFT imaging systems. Generally, the present subject matter can be used in biometric scanning applications where wetting of the skin to a platen surface enhances contrast in corresponding imaging or detection (e.g., contrast is enhanced in response to a presence of the liquid versus no liquid). A right-angle prism 110 as shown illustratively in FIG. 1 (along with a corresponding prism 210 as shown in FIG. 2). Other configurations can be used. For example, a prism used in a biometric scanner can have another triangular cross-section (such as other than a right-triangle), or can include a rectangular block, a plano-plano plate, or other configuration.

FIG. 2 illustrates generally an example comprising a portion of a biometric scanning system comprising a porous region 200 associated with (or defined by) a contact platen surface 211. Generally, the porous region 200 serves as the platen area and can include a porous plate that is placed upon or otherwise fixed to a surface of the prism 210 or it may be etched or otherwise fabricated as a portion of the prism 210. The porosity of the plate is not drawn to scale relative to the finger 102 of FIG. 2, but rather the porosity has been magnified in order to illustrate various aspects of the present subject matter. Although pore structures (e.g., such as defined by respective channels 202) are periodic as illustrated in FIG. 2, other configurations can be used. For example, as discussed below in relation to FIG. 4A and FIG. 4B, a distribution of pore structures, pore size, or other aspect of the porous region 200 can include a random distribution.

A thickness of the porous region 200 can be represented as "$T_p$," and such thickness can be established according to different criteria. For example, such thickness $T_p$ may have a maximum achievable value or other constraint dictated by a fabrication process. A tradeoff may exist between thickness $T_p$ and image quality or assembly cost. For example, a reduced thickness $T_p$ may result in one or more of lower cost or enhanced image quality, but subject to a thickness constraint that is reliably achievable for a particular fabrication approach and related material. By way of example, the thickness $T_p$ can be in the range of 0.1 millimeters (mm) to 3 mm. Generally, the porous region 200 defines or comprises microfluidic channels that are sized and shaped to hold a liquid.

Depending upon system specifications such as a capacity of porous region 200 to hold liquid and the liquid consumption rate (e.g., due to losses such as evaporation or lift off), the porous region 200 can be supplied by a reservoir 280 to supply the porous region 200 with liquid. If the reservoir 280 is included, a cavity or other structure such as channel 203 can be included to convey a liquid 270 from reservoir 280 to the porous region 200, and in this manner, the reservoir is fluidically coupled with the contact platen surface 211. The channel 203 may be formed or included as a portion of the porous region 200 or a separate structure such as having the thickness $T_c$ corresponding to one or more spacers 260. Such spacers 260 can include separate structures or material that differ from the porous region 200 or prism 210 material, such as shim material, or may be etched, molded, or otherwise formed as a portion of the prism 210 or part of a porous plate that comprises the porous region 200. Generally, the liquid 270 is conveyed by the channel 203 to the contact platen surface 211 through respective porous channels 202 of the porous region 200, and the liquid can contact any object to be imaged, such as skin at a fingertip of the finger 102, that is in contact with the contact platen surface 211.

One or more forces can facilitate transport of liquid 270 from the optional reservoir 280 to the contact platen surface 211. For example, a force can be mechanical, such as where a mechanical force acts upon the reservoir 280 externally to force the liquid from the reservoir 280 toward the contact platen surface 211. Examples include constructing reservoir 280 out of a stretchable material or affixing such material to a flexible vessel forming the reservoir 280. The liquid 270 can be used to pressurize the reservoir 280 when filled and the stretchable material causes the reservoir 280 to act as a bladder expelling the liquid 270 into the channel 203. In another example, a mechanical force can be established by applying pressure on one or more sides of reservoir such as using a motor or other actuator. In yet another example, application of mechanical force can be achieved from stored mechanical potential energy such as using a compressed or wound spring, where energy is stored during assembly or during liquid 270 replenishment (e.g., by twisting a rotary structure or pressing a linear structure or actuator).

Use of externally-applied mechanical force is merely illustrative. In another example, liquid 270 can be transported from the reservoir 280 to the contact platen surface 211 passively using, e.g., capillary force. For example, to enhance capillary transport, a viscosity can be specified for the liquid 270, based on one or more parameters, such as a surface tension of the liquid 270 in relation to the material comprising the boundaries of the channel 203 and respective walls (defined by a solid portion 201) of the porous channels 202 of porous region 200, the channel thickness $T_c$, or a porous channel size $L_c$ (e.g., a pore diameter or other linear dimension defining respective pore structures), or combinations thereof.

The liquid 270 used for wetting in the examples in this document can be specified as a low volatility material to suppress evaporation. Generally, the liquid is specified to have properties (e.g., optical or dielectric) specified to substantially match those of a solid material of a porous region housing the liquid. Liquids such as oils can be specified to provide a targeted optical index of refraction, and such liquids are commercially obtainable. For example, Cargille Laboratory (Cedar Grove, NJ, https://www.cargille.com/) can supply standard oils with relative indices of refraction in the range from 1.300 to 1.800 in steps of at least 0.005 units. Cargille can also supply custom liquids based upon specifications such as viscosity and index of refraction. A liquid for use as described in this document can be antimicrobial, antibacterial, or antiviral, or can be treated with an agent to provide one or more such properties. Certain oils are naturally antimicrobial. For example, antibacterial properties are exhibited by oils extracted from oregano, thyme, clove, lavender, clary sage, and arborvitae. Other essential oils can also exhibit antimicrobial properties, such as peppermint, cajuput, cinnamon, eucalyptus, and tea tree.

Oils or other liquids can be made antiseptic through the addition of one or more anti-microbial molecules, liquids, or elements. For example, compounds such as triclosan and triclocarban are used as antibacterial agents in soaps and are believed compatible with various oils. Other antibacterial agents using in soaps include benzalkonium chloride, benzethonium chloride, and chloroxylenol, and such agents are believed compatible with various oils.

Generally, according to the various approaches described herein, any active approach or passive action to transport liquid 270 from the reservoir 280 to the contact platen surface 211 may be established to avoid excess (or any) pooling of liquid 270 on the contact platen surface 211. For example, in an FTIR-based approach (and as believed applicable to other approaches), a very thin layer of liquid 270 is to be established at the contact platen surface 211. As an illustration, such a liquid layer can be from tens of nanometers to several microns, to enable the wetting of dry skin topological features such as ridges, to enhance contrast between skin topological features such as ridges and valleys.

Use of a capillary transport effect for liquid 270 transport can provide a self-limiting flow of liquid 270 without requiring active regulation. For example, once liquid 270 reaches the contact platen surface 211, it will stop flowing, if driven primarily (or exclusively) by capillary transport. For other approaches, such as involving application of mechanical force externally, various approaches can be used to regulate the liquid 270 flow to inhibit undesired pooling or waste.

In an example, the porous region 200 or the reservoir 280 (if included) can be configured to house sufficient liquid for a specified lifetime or other use duration of the platen assembly. In another example, liquid replenishment may be desired, such as for applications involving significantly more fingerprint scanning traffic than can be accommodated using the "lifetime fill" approach. Various approaches can be used for liquid replenishment and may vary depending on whether a reservoir 280 is included. As an illustrative example, where a reservoir 280 is included, a port 255 or other structure can be included on or as a portion of a housing 204, where the port defines a pathway to the reservoir 280 for liquid 270 to be replenished either in the field (e.g., at a customer site) or at another specified location (e.g., a servicing center or production facility). As another illustrative example, liquid can be initially applied or replenished by pooling liquid directly on the contact platen surface 211, such as for a specified duration, and over such a duration, capillary forces can draw such fluid into the porous region 200 or even back to the reservoir 280 (if included).

In yet another variation (either in addition or alternatively to such direct dispensing of liquid), a mechanical force, such as a weighted or levered cover may be applied to a pool of liquid located on the contact platen surface 211 to help force the liquid into the porous region 200 and toward the reservoir 280 (if present). Such a weighted or levered cover can include gasket material around its perimeter. Such gasketing material, when mated with the housing 204 on or nearby the contact platen surface 211, can help to prevent pooled liquid under pressure from escaping or leaking outside the porous region 200. The port 255 or another port, whether or not it is accessible from outside the housing 204, may serve as a pressure relief structure, such as to suppress or prevent a vacuum build-up in the reservoir 280. Such a vacuum build-up may otherwise counter-act capillary forces that would otherwise draw the liquid 270 out of the reservoir 280. The port 255 or another port can allow air that might be trapped in the reservoir 280 (or elsewhere) to escape when under pressure, such as when external forces are displacing liquid from the contact platen surface 211 into the reservoir 280 or from the port 255 into the reservoir 280. The port 255 (or another port) can be configured to facilitate the passage of air while suppressing or inhibiting the passage of liquid 270 (e.g., preventing liquid 270 from escaping through the port 255).

Respective liquid and channel dimensions ($T_c$ and $L_c$) can be a function of whether or not capillary forces are to be used for transport. Such dimensions can also impact image quality, mechanical robustness of the platen structure, or cleanliness and hygienic aspects of the system. From an imaging perspective, properties of the liquid 270 can be specified based, at least in part, on the imaging modality, such as to match those of the solid portion 201 of porous region 200. By way of example, if the imaging technology modality is optical, then the indices of refraction of the liquid 270 and the solid portion 201 (e.g., a bulk or substrate of the porous region 200) should be substantially similar. If the imaging modality uses capacitive sensing, then one or more constitutive parameters such as a relative dielectric permittivity of the two materials can be specified to be substantially similar.

Because there will generally be some slight mismatch of optical properties, the channels of diameter or width $L_c$ (corresponding to pore size) can be specified to be smaller than a corresponding imaging resolution of the imaging sensor, such as a "final imaging resolution." Note that such a final imaging resolution need not match the raw image resolution capability of the imaging sensor. As an illustrative example, if the imaging sensor raw resolution is 800 ppi (points per inch) and the final processed image is downsampled to 500 ppi, then the channel diameter need not necessarily be below the imaging sensor raw imaging resolution. In such an example, pixel averaging can be performed before the final image is output.

In an example where a periodic structure is used, a periodicity or average periodicity, L, of the porous region 200 can be specified to be small enough that multiple channels fall within the imaging resolution of the scanner. In such an example, if multiple channels fall within a resolving spot size, then an averaging of optical properties of the porous region within the resolution of the imaging system will not be as dependent upon the exact alignment of features of the porous region 200 in the contact platen surface 211.

Figure 3A:
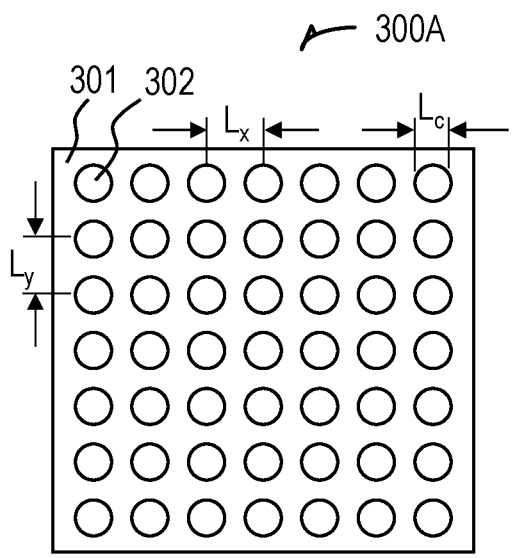
FIG. 3A and FIG. 3B illustrate respective examples comprising different periodic configurations of channels that can define a porous region.
Figure 3B:
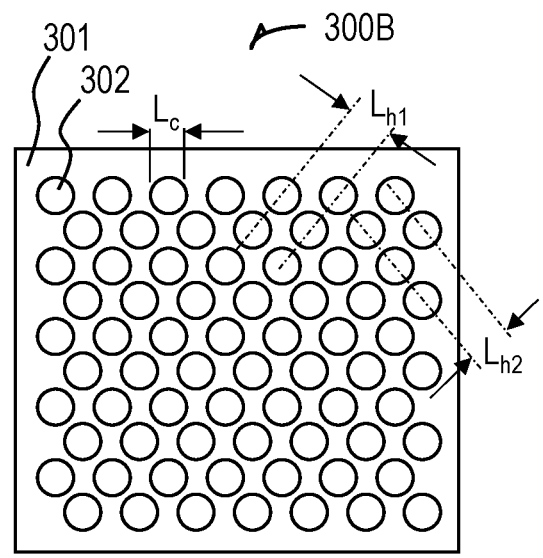

While FIG. 2 shows an illustrative example of a cross section, a plan view looking down toward the contact platen surface 211 can show that a configuration of respective channels 202 can create a two-dimensional pattern, such as a regular lattice or other pattern of respective channels 202 in the solid portion of 201 of the porous region 200. As an illustration of such two-dimensional patterns, the plan views of FIG. 3A and FIG. 3B illustrate respective examples comprising different periodic configurations of channels 302 that can define a porous region. In FIG. 3A, a porous region 300A has a matrix of respective channels 302 (e.g., microcapillaries or microchannel structures) that are arranged in a rectangular grid in solid material 301, with a period that can be represented by center-to-center distance $L_x$ in the horizontal axis and center-to-center distance $L_y$ in the vertical axis of the page. Although the respective channels 302 are illustrated as a circular cross section having a diameter $L_c$, other shapes can be used, such as having non-circular cross sections. Examples of non-circular cross sections can include squares, rectangles, ellipses, triangles, or arbitrary shapes. In FIG. 3B the respective channels 302 of a porous region 300B are arranged in a hexagonal grid that may be defined by grid separation dimensions $L_{h1}$ and $L_{h2}$. As in FIG. 3A, the respective channels 302 in the solid material 301 of the porous region 300B of FIG. 3B need not be circular in cross section and can be defined by another shape.

Figure 4A:
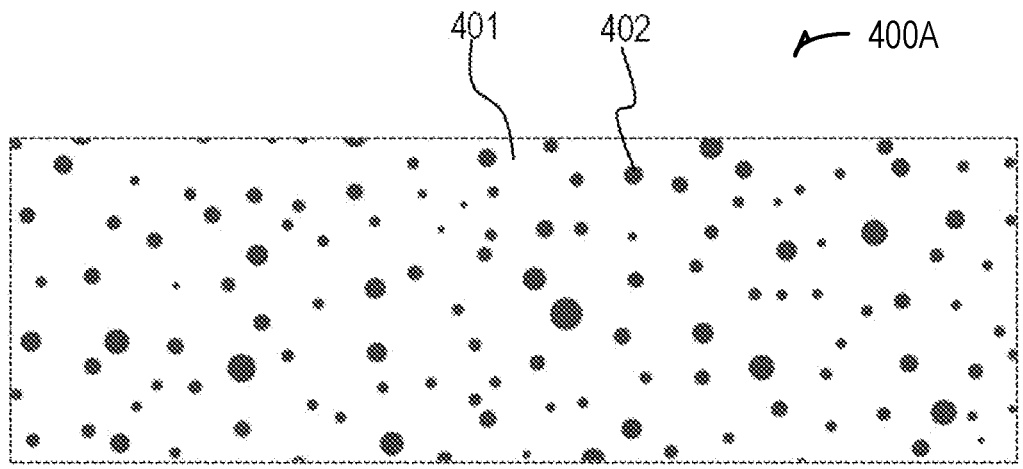
FIG. 4A and FIG. 4B illustrate respective examples comprising different configurations of a pore structures that can define a porous region.
Figure 4B:
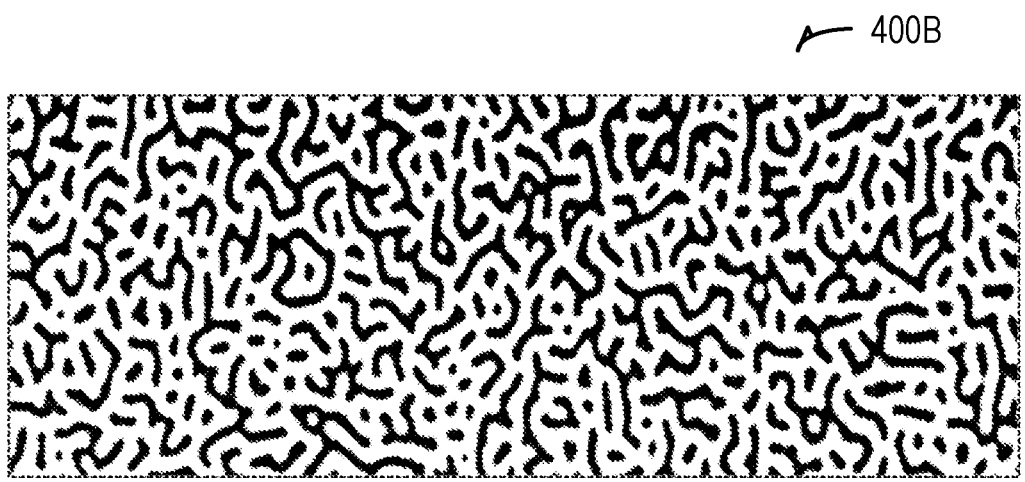

The porous regions 300A and 300B of the examples of FIG. 3A and FIG. 3B are merely illustrative. A porous region as described herein need not be periodic, symmetric, or even regular. For example, FIG. 4A and FIG. 4B illustrate respective examples comprising different configurations of a pore structures that can define a porous region, such as having one or more random aspects. Such randomness can include a random distribution of pore dimensions, such as within a specified range of values, or a random distribution of pore locations. For example, in FIG. 4A, a porous region 400A is shown, such as corresponding to a top-down view looking toward a contact platen surface 211 as shown in FIG. 2. In FIG. 4A, respective channels 402 can be represented by dark circles in a solid material 401. The respective channels 402 of FIG. 4A are shown as circular but can be defined by other non-circular shapes and can be uniform in diameter or can vary in diameter, such as having a random distribution of diameters (or other dimension if non-circular), or a random distribution of locations, or both.

In FIG. 4B, a porous region 400B can be defined as a random web of isolated or intertwined channels. Such a pattern can exist across a contact platen surface, such as having a view looking down as shown in FIG. 4B, or such a pattern can exist in cross section (e.g., orthogonal to the view of FIG. 4B), or both. Generally, the porous region 400B will provide a pathway through a cross-section of material such that liquid can flow or propagate from the interior of the platen to provide liquid at a surface of the platen. As described elsewhere herein, channels of the porous region 400B can provide volume to store liquid, and a reservoir may be used to supply additional liquid. Use of the phrase "random" in the relation to the examples of FIG. 4A and FIG. 4B, or other examples herein, can include "quasi-random" distributions of pore dimensions or shape that are not strictly random, but are still irregular at least at microscale. For example, a larger repeating macro structure can be formed by periodically-repeating blocks of random or aperiodic microstructures.

Fabrication of the structure of the porous regions for applications as described herein can include various approaches. For example, a periodic array of capillary tubes (e.g., a microcapillary array) can be created by a fiber drawing and etching process. In such processing, multiple fibers are fused together, sometimes with heat, and drawn to create a fiber bundle with a specified fiber-to-fiber center separation. The more the fiber bundle is drawn down, the smaller the fibers and their separation become. Once drawn down, multiple drawn-down fiber bundles can be fused together, and the resulting larger fiber bundle drawn down again until a final fused bundle-of-bundles achieves a specified cross-sectional size, and a specified fiber-to-fiber separation is achieved. The fused bundle can be cut and polished to provide plate structures having a specified thickness (for example, corresponding to thickness $T_p$ as illustrated in FIG. 2). The cores of fibers forming such bundles are etched to form the hollow capillary tubes. Such capillary tubes may have a direction that is perfectly perpendicular to a surface plane of a cut plate or may have an orientation that is angled other than perpendicular, depending upon an angular orientation of the cut from the final drawn-down fused fiber bundle.

For an application involving optical imaging of a skin print (e.g., a fingerprint) in a biometric scanner that operates at between 500 ppi and 1000 ppi (such as imaging at 500 ppi or 1000 ppi), a diameter of the capillary tubes can be specified to be less than 50 µm (corresponding to 500 ppi imaging) or less than 25 µm (corresponding to 1000 ppi imaging), to avoid interfering with imaging. Having small capillary tube openings can also help to suppress or eliminate contaminants or foreign material (e.g., dust, dirt, or shed skin) from the ambient environment from fouling the porous region, or to suppress deformation of skin features being imaged. Examples of capillary tube arrays can be obtained from Collimated Holes Inc. (Campbell, CA, http://www.collimatedholes.com/), and Incom, Inc. (Charlton, MA, https://incomusa.com/). Examples from these vendors include hexagonal close packed capillary tube arrays available with capillary holes having a diameter of 5 µm and even smaller.

Generally, as discussed elsewhere herein, the porous region is configured to bring a wetting liquid to a surface of a platen such that skin can wet to the surface. Accordingly, it is not necessary that an arrangement of respective pores such as capillary structures have a high fill-factor across a surface of the platen. For example, if a regular or periodic array is used, vacancies can exist in the array where there is no respective channel, small bundles of channels can be arranged sparsely across a surface of the platen, or a separation between respective channels can be much larger than the size of a respective channel. Generally, contact of an object such as skin with the platen will help to spread the liquid across a surface of the platen. As an illustrative example, a 5 µm capillary tube diameter (for example dimension $L_c$ as shown in FIG. 2) can be used, such as with a tube-to-tube separation of 7 µm (for example dimension L as shown in FIG. 2). To enhance mechanical robustness, a capillary tube diameter may still be 5 µm, but the tube-to-tube separation can be increased to 10 µm or even 15 µm, as illustrative examples.

The porous region need not be fabricated to have a periodic structure. For example, techniques can be used to provide a random or aperiodic structure. For example, a composite material may be mixed such that there are two or more distinct materials in the mixture and then one or more of the materials etched, dissolved, or otherwise removed (such as to provide a configuration more similar to the examples of FIG. 4A or FIG. 4B, discussed above).

As an illustration, sandstone or pumice have morphology defining a porous matrix that can trap and hold liquid. Although these materials are not transmissive to light, a similar morphology can be established in an optically-transmissive solid material. The removal of material from the mixture mentioned above may be accomplished by heat in lieu of or in conjunction with an etching or solvent-based removal technique. For example, a solution of two or more materials may be mixed and one or more of the materials may cool sooner than the others. Additionally, one of the materials may have a boiling point that differs from another material, allowing one material to be lifted away while preserving a solid matrix of another material defining channels. Reduction in pressure, for example creating a partial vacuum can aid in the escape of a liquid material that is being lifted off using a solvent or via boiling. In this manner, one material can be solidifying or solid, and another material escapes to define a matrix. As the boiling material works to escape a solidifying matrix, a series of voids can be formed, and escaping material need not be exclusively the boiling material.

For example, escaping material can include air, a gas such as $CO_2$, or water vapor, in a similar manner as how metamorphic rock is formed. Formation of a porous material can involve multiple operations. A first portion of a process may produce porosity that is too coarse and could otherwise create voids that are undesirably large at a platen surface, such as would too easily trap contaminants or deform fingerprint features as the skin deforms into the porous cavities. A portion of a process can include forming another layer on a first fabricated layer, such as having a specified finer porosity. Generally, as mentioned elsewhere herein, a prism or other structure forming the platen can be coated with a material to establish the porous region, or the porous region can be formed directly in the material of a prism or other structure, such as using an etching process or other process. In yet another example, a porous region can be formed using a porous glass, a controlled pore glass, or a "frit" glass. Suppliers of examples of porous glass include CoorsTek (Tokyo, Japan, https://www.coorstek.co.jp/) and Adams & Chittenden Scientific Glass Coop (Berkeley, CA, https://adamschittenden.com/). For example, frit or sintered glass plates from Adams & Chittenden are available having pore sizes of 200 μm down to 0.9 μm. Sintered glass plates are used in other applications for filtering of fluids and are produced in high volume.

Figure 5:
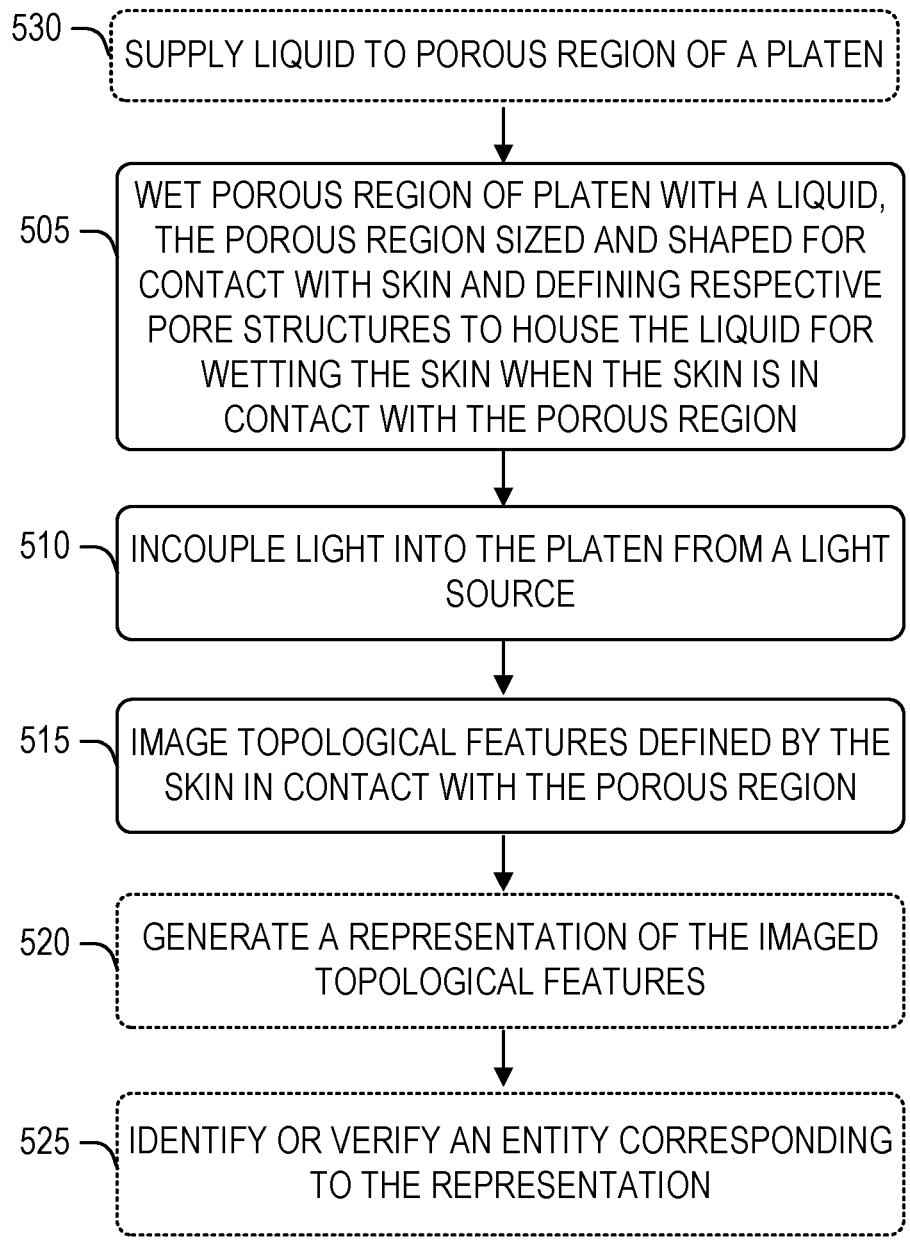
FIG. 5 illustrates generally a technique, such as a method for imaging topological features defined by skin of a subject, and such as using a wetted porous region as shown and described in relation to other examples in this document.

FIG. 5 illustrates generally a technique 500, such as a method for imaging topological features defined by skin of a subject, and such as using a wetted porous region as shown and described in relation to other examples in this document. At 505, a porous region of a platen can be wetted with a liquid, the porous region sized and shaped for contact with skin and defining respective pore structures to house the liquid for wetting the skin when the skin is in contact with the porous region. At 510, light is incoupled into the platen from a light source. The platen can be defined by an optical prism as shown and described elsewhere herein. At 515, topological features defined by the skin can be imaged, such as ridges in contact with the porous region. As described elsewhere herein, such imaging can be facilitated by using a frustrated total internal reflection (FTIR) imaging technique where features such as ridges result in absorption or out-coupling of light that would otherwise be reflected internally within an optical structure such as a prism. Optionally, at 520, a representation of the imaged topological features can be generated. Such a representation can include a bitmap image, or other data indicative of imaged features. At 525, an entity such as a unique individual can be identified, based upon matching of the representation of the imaged topological features and data stored for that individual in a database. Optionally, at 530, liquid can be supplied to a porous region of the platen, such as using surface pooling or from a reservoir, as shown and described elsewhere herein.

Figure 6:
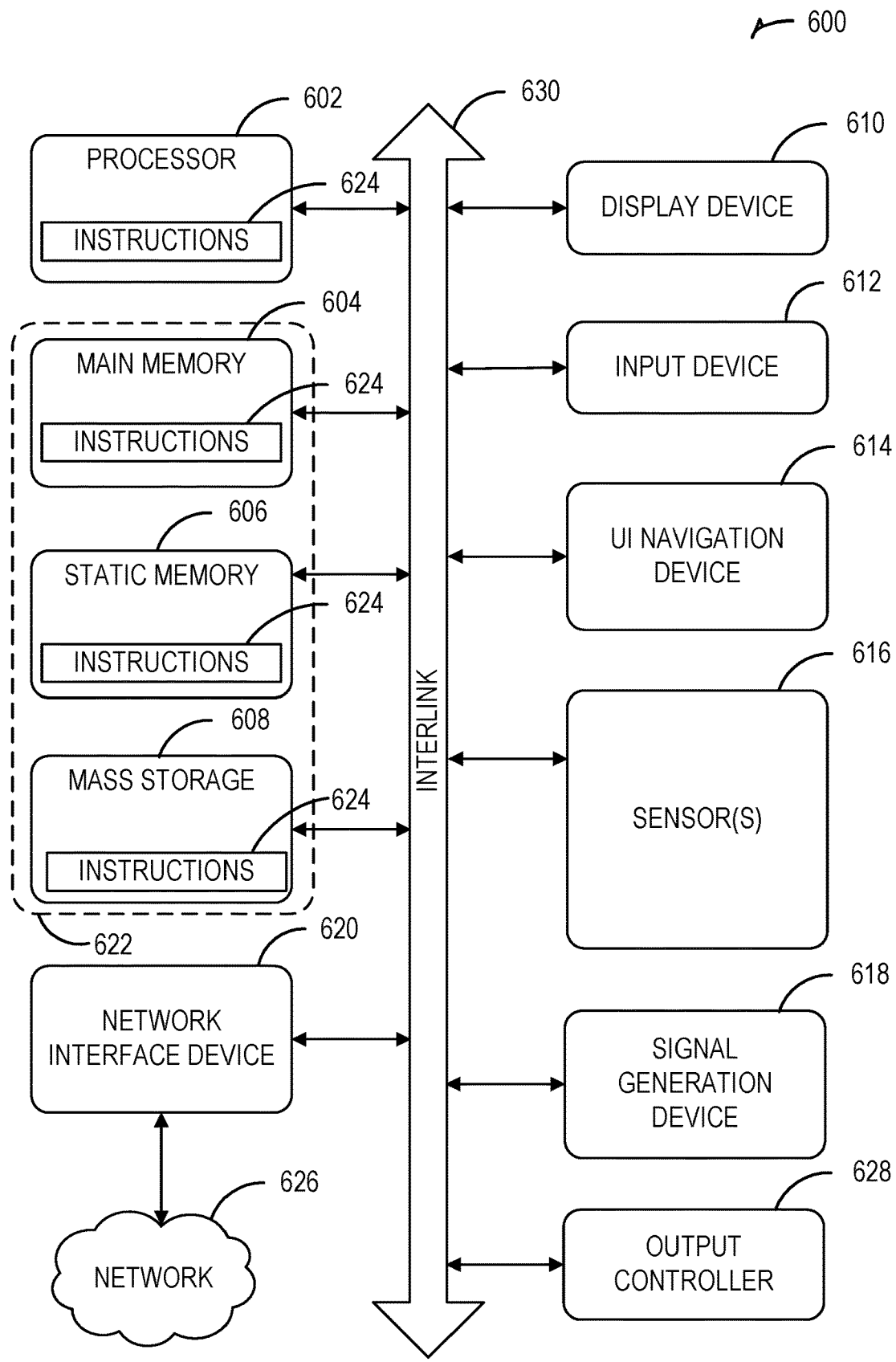
FIG. 6 illustrates a block diagram of an example comprising a machine upon which any one or more of the techniques (e.g., methodologies) discussed herein may be directed or automated, at least in part.

FIG. 6 illustrates a block diagram of an example comprising a machine 600 upon which any one or more of the techniques (e.g., methodologies) discussed herein may be directed or automated, at least in part. Machine 600 (e.g., computer system) may include a hardware processor 602 (e.g., a central processing unit (CPU), a graphics processing unit (GPU), a hardware processor core, or any combination thereof), a main memory 604 and a static memory 606, connected via an interlink 630 (e.g., link or bus), as some or all of these components may constitute hardware for systems or related implementations discussed above.

Generally, the hardware processor 602 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor circuit may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW (very-long instruction word), vector processing, or SIMD (Single Instruction, Multiple Data) that allow each core to run separate instruction streams concurrently. A processor circuit may be emulated in software, running on a physical processor, as a virtual processor or virtual circuit. The virtual processor may behave like an independent processor but is implemented in software rather than hardware.

Specific examples of main memory 604 include Random Access Memory (RAM), and semiconductor memory devices, which may include storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; or optical media such as CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612, and UI navigation device 614 may be a touch-screen display. The machine 600 may include a mass storage device 608 (e.g., drive unit), a signal generation device 618 (e.g., a speaker), a network interface device 620, and one or more sensors 616, such as a global positioning system (GPS) sensor, compass, accelerometer, or some other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 608 may comprise a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 608 comprises a machine-readable medium.

Specific examples of machine-readable media include, one or more of non-volatile memory, such as semiconductor memory devices (e.g., EPROM or EEPROM) and flash memory devices; magnetic disks, such as internal hard disks and removable disks; magneto-optical disks; RAM; or optical media such as CD-ROM and DVD-ROM disks. While the machine-readable medium is illustrated as a single medium, the term "machine readable medium" may include a single medium or multiple media (e.g., a centralized or distributed database, or associated caches and servers) configured to store the one or more instructions 624.

An apparatus of the machine 600 includes one or more of a hardware processor 602 (e.g., a central processing unit (CPU), a graphics processing unit (GPU), a hardware processor core, or any combination thereof), a main memory 604 and a static memory 606, sensors 616, network interface device 620, antennas, a display device 610, an input device 612, a UI navigation device 614, a mass storage device 608, instructions 624, a signal generation device 618, or an output controller 628. The apparatus may be configured to perform one or more of the methods or operations disclosed herein.

The term "machine readable medium" includes, for example, any medium that is capable of storing, encoding, or carrying instructions for execution by the machine 600 and that cause the machine 600 to perform any one or more of the techniques of the present disclosure or causes another apparatus or system to perform any one or more of the techniques, or that is capable of storing, encoding or carrying data structures used by or associated with such instructions. Non-limiting machine-readable medium examples include solid-state memories, optical media, or magnetic media. Specific examples of machine-readable media include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); or optical media such as CD-ROM and DVD-ROM disks. In some examples, machine readable media includes non-transitory machine-readable media. In some examples, machine readable media includes machine readable media that is not a transitory propagating signal.

The instructions 624 may be transmitted or received, for example, over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

In an example, the network interface device 620 includes one or more physical jacks (e.g., Ethernet, coaxial, or other interconnection) or one or more antennas to access the communications network 626. In an example, the network interface device 620 includes one or more antennas to wirelessly communicate using at least one of single-input multiple-output (SIMO), multiple-input multiple-output (MIMO), or multiple-input single-output (MISO) techniques. In some examples, the network interface device 620 wirelessly communicates using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES AND EXAMPLES

Example 1 comprises biometric scanning system. The system can include a platen with a porous region sized and shaped for contact with a subject's skin and defining pore structures to house a liquid for wetting the skin, a light source to illuminate the platen, and an imaging sensor to image topological features defined by the skin in contact with the porous region, the topological features contrasting with a background field illuminated by the light source. The contrast is enhanced when liquid is present.

Example 2 includes the subject matter of Example 1, with the optional additional feature of a reservoir for the liquid that is fluidically coupled with the porous region.

Example 3 includes the subject matter of Example 2, with the optional additional feature of a channel or cavity fluidically coupling the porous region with the reservoir.

Example 4 includes the subject matter of any of Examples 1-3, with the optional additional feature that the porous region can receive liquid via external mechanical force or passive action.

Example 5 includes the subject matter of Example 4, specifying that the passive action is capillary action.

Example 6 includes the subject matter of any of Examples 1-5, where pore locations or sizes in the porous region are random.

Example 7 includes the subject matter of any of Examples 1-5, with the pore locations defining an array or lattice configuration.

Example 8 includes the subject matter of Example 7, wherein the porous region comprises a microcapillary array.

Example 9 includes the subject matter of any of Examples 1-6, wherein the porous region comprises etched or frit material.

Example 10 includes the subject matter of any one of Examples 1-9, wherein the platen is a prism face or plate optically and mechanically coupled to the prism.

Example 11 includes the subject matter of any one of Examples 1-10, wherein the pore sizes are smaller than can be resolved using the imaging sensor, associated optical elements, and associated image processing.

Example 12 includes the subject matter of any one of Examples 1-11, further comprising the liquid.

Example 13 includes the subject matter of Example 12, wherein the liquid contains an antimicrobial agent.

Example 14 includes the subject matter of Example 12, wherein the liquid is an oil.

Example 15 includes the subject matter of Example 12, wherein the liquid refractive index is substantially similar to a refractive index of a solid material defining the porous region.

Example 16 includes the subject matter of any one of Examples 1-15, wherein the topological features comprise at least a portion of a fingerprint.

Example 17 comprises a method for enhancing biometric scanning. The method comprising wetting a platen porous region with liquid, the region sized and shaped for skin contact and the porous region sized and shaped for contact with skin of a subject, the porous region defining respective pore structures to house the liquid for wetting the skin when the skin is in contact with the porous region. Light is coupled into the platen from a light source. Topological skin features contacting the region are imaged, the features contrasting against the illuminated background. Contrast is enhanced by the liquid presence.

Example 18 includes the subject matter of Example 17, further comprising optionally supplying liquid to the region from a coupled reservoir.

Example 19 includes the subject matter of Example 17, wherein the region optionally receives liquid via external force or passive action.

Example 20 includes the subject matter of Example 19, specifying that the passive action is capillary action.

Example 21 includes the subject matter of any one of Examples 17-20, wherein initially applying or replenishing liquid by pooling liquid on the porous region.

Example 22 includes the subject matter of any one of Examples 17-21, wherein the topological features comprise at least a portion of a fingerprint.

Example 23 comprises a biometric scanning system. The system can include a platen with a porous region sized and shaped for skin contact and defining pores to house liquid for wetting the skin, a reservoir fluidically coupled to the region, a light source, and an imaging sensor to image topological features defined by the skin in contact with the porous region, the topological features contrasting with a background field illuminated by the light source. The porous region comprises a glass structure with etched material, frit material, or an array or lattice of pores.

Example 24 includes the subject matter of Example 23, further comprising liquid where a refractive index of the liquid is substantially similar to a refractive index of the glass structure comprising the porous region.

Example 25 includes the subject matter of Example 23, where the topological features comprise at least a portion of a fingerprint.

Each of the non-limiting examples above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A biometric scanning system, comprising:
    a platen comprising a porous region sized and shaped for contact with skin of a subject, the porous region defining respective pore structures to house a liquid for wetting the skin when the skin is in contact with the porous region;
    a light source configured to illuminate the platen;
    an imaging sensor configured to image the platen including imaging topological features defined by the skin in contact with the porous region, the topological features contrasting with a background field illuminated by the light source;
    a reservoir for the liquid; and
    a channel or cavity fluidically coupling the porous region with the reservoir;
    wherein the contrast is enhanced when the liquid is present.

2. The biometric scanning system of claim 1, wherein the porous region is configured to receive the liquid using at least one of an externally-applied mechanical force, or passive action.

3. The biometric scanning system of claim 2, wherein the passive action comprises capillary action.

4. The biometric scanning system of claim 1, wherein respective pore locations or respective pore sizes within the porous region are random.

5. The biometric scanning system of claim 1, wherein respective pore locations within the porous region define an array or lattice configuration.

6. The biometric scanning system of claim 1, wherein the porous region comprises a at least one of an etched material, a frit material, or a microcapillary array.

7. The biometric scanning system of claim 1, wherein the platen comprises a face of a prism or a plate optically and mechanically coupled to the prism.

8. The biometric scanning system of claim 1, wherein respective pores defined by the porous region are smaller than can be resolved using the imaging sensor, associated optical elements, and associated image processing.

9. The biometric scanning system of claim 1, further comprising the liquid, the liquid comprising an antimicrobial agent.

10. The biometric scanning system of claim 1, further comprising the liquid, the liquid comprising an oil.

11. The biometric scanning system of claim 1, further comprising the liquid;
wherein a refractive index of the liquid is substantially similar to a refractive index of a solid material defining the porous region.

12. The biometric scanning system of claim 1, wherein the topological features comprise at least a portion of a fingerprint.

13. A method for enhancing biometric scanning in a biometric scanning system, the method comprising:
wetting a porous region of a platen with a liquid through a channel or cavity fluidically coupling the porous region with a reservoir for the liquid, the porous region sized and shaped for contact with skin of a subject, the porous region defining respective pore structures to house the liquid for wetting the skin when the skin is in contact with the porous region;
incoupling light into the platen from a light source; and
imaging topological features defined by the skin in contact with the porous region, the topological features contrasting with a background field illuminated by the light source, the contrasting enhanced in response to a presence of the liquid.

14. The method of claim 13, wherein the porous region is configured to receive the liquid using at least one of an externally-applied mechanical force, or passive action.

15. The method of claim 14, wherein the passive action comprises capillary action.

16. The method of claim 13, wherein the topological features comprise at least a portion of a fingerprint.

17. A biometric scanning system, comprising:
a platen comprising a porous region sized and shaped for contact with skin of a subject, the porous region defining respective pore structures to house a liquid for wetting the skin when the skin is in contact with the porous region;
a reservoir for the liquid, the reservoir fluidically coupled with the porous region, the porous region is configured to receive the liquid using passive action;
a light source configured to illuminate the platen; and
an imaging sensor configured to image the platen including imaging topological features defined by the skin in contact with the porous region, the topological features contrasting with a background field illuminated by the light source;
wherein the porous region comprises a glass structure comprising at least one of:
an etched material;
a frit material; or
an array or lattice configuration of respective pores.

18. The biometric scanning system of claim 17, further comprising the liquid;
wherein a refractive index of the liquid is substantially similar to a refractive index of the glass structure comprising the porous region.

* * * * *